United States Patent
Ganapathy et al.

(10) Patent No.: US 12,507,981 B2
(45) Date of Patent: Dec. 30, 2025

(54) SYSTEMS AND METHODS FOR DETECTION OF TRAUMATIC BRAIN INJURY USING COMBINED 3D COMPUTATIONAL MODELING AND ELASTOGRAPHY

(71) Applicant: UtopiaCompression Corporation, Los Angeles, CA (US)

(72) Inventors: Priya Ganapathy, West Sacramento, CA (US); Lakshmi Priya Rangaraju, Los Angeles, CA (US); Jacob Yadegar, Los Angeles, CA (US)

(73) Assignee: UtopiaCompression Corporation, Los Angeles, CA (US)

( * ) Notice: Subject to any disclaimer, the term of this patent is extended or adjusted under 35 U.S.C. 154(b) by 150 days.

(21) Appl. No.: 18/190,274

(22) Filed: Mar. 27, 2023

(65) Prior Publication Data
US 2023/0301621 A1 Sep. 28, 2023

Related U.S. Application Data

(60) Provisional application No. 63/323,947, filed on Mar. 25, 2022.

(51) Int. Cl.
*A61B 8/00* (2006.01)
*A61B 8/08* (2006.01)

(52) U.S. Cl.
CPC ............ *A61B 8/085* (2013.01); *A61B 8/4494* (2013.01); *A61B 8/485* (2013.01); *A61B 8/5246* (2013.01); *A61B 8/5269* (2013.01)

(58) Field of Classification Search
CPC ....... A61B 8/085; A61B 8/4494; A61B 8/485; A61B 8/5246; A61B 8/5269; G06T 2200/08; G06T 2207/30041
See application file for complete search history.

(56) References Cited

U.S. PATENT DOCUMENTS

| | | |
|---|---|---|
| 6,387,051 B1 | 5/2002 | Ragauskas |
| 8,672,851 B1 | 3/2014 | Quirk |
| 2011/0137182 A1 | 6/2011 | Bellezza |
| 2011/0243415 A1 | 10/2011 | Yonezawa |

(Continued)

OTHER PUBLICATIONS

Killer, H.W., et al. Architecture of Arachnoid Trabeculae, Pillars, and Septa in the Subarachnoid Space of the Human Optic Nerve: Anatomy and Clinical Considerations. Br J Ophthalmol. 2003. vol. 87, No. 6, pp. 777-781.

(Continued)

*Primary Examiner* — Pascal M Bui Pho
*Assistant Examiner* — Gabriel Victor Popescu
(74) *Attorney, Agent, or Firm* — Hinckley Allen & Snyder; Stephen Holmes

(57) ABSTRACT

The present disclosure describes a unique method and system for combining 3D ONS modeling with an elastography measurement (shear wave pulse measurement at a fixed depth) to capture strain values within the ONS wall tissue giving a more reliable assessment of both prior and current TBI, preferably without maneuvers to artificially increase intracranial pressure (ICP). Imaging for the 3D modeling and the elastography utilizes he same H-transducer to obtain B-Mode and shear wave pulse images. The combined data is used in a discriminatory Machine Learning system to provide a discriminatory outcome of TBI.

13 Claims, 11 Drawing Sheets

(56) References Cited

U.S. PATENT DOCUMENTS

| | | | |
|---|---|---|---|
| 2013/0150684 A1 | 6/2013 | Cooner | |
| 2014/0043933 A1* | 2/2014 | Belevich | A61B 8/4494 |
| | | | 367/11 |
| 2015/0051489 A1 | 2/2015 | Caluser | |
| 2016/0000367 A1* | 1/2016 | Lyon | A61B 5/031 |
| | | | 600/410 |
| 2020/0077906 A1 | 3/2020 | Lyon | |
| 2021/0259661 A1* | 8/2021 | Amador Carrascal | |
| | | | A61B 8/5269 |
| 2021/0295500 A1* | 9/2021 | Liu | A61B 8/0825 |

OTHER PUBLICATIONS

Kimberly, H. H., et al. Correlation of Optic Nerve Sheath Diameter with Direct Measurement of Intracranial Pressure. Society for Academic Emergency Medicine. 2008. col. 15, No. 2, pp. 201-204. https://doi.org/10.1111/j.1600-0404.2011.01614.x, Bolouri H, Säljö A, Viano DC, Hamberger A. Animal model for sport-related concussion; ICP and cognitive function. Acta Neurol Scand. Apr. 2012; 125(4):241-7.
Cartwright MS, Dupuis JE, Bargoil JM, Foster DC. Can a combination of ultrasonographic parameters accurately evaluate concussion and guide return-to-play decisions?. Med Hypotheses. 2015;85(3):262-265.
Comaniciu, D; Meer P, (2002) "Mean Shift: A Robust Approach Toward Feature Space Analysis". IEEE Transactions on Pattern Analysis and Machine Intelligence (IEEE) 24 (5): 603-619.
Dutton RP, Sewell J, Aarabi B, Scalea TM, "Preliminary Trial of a Noninvasive Brain Acoustic Monitor in Trauma Patients with Severe Closed Head Injury", Journal of Trauma, Nov. 2002, pp. 857-863.
Garcia, et al., "3D ultrasound coronal C-scan imaging for optic nerve sheath meningioma," British Journal of Ophthalmology, vol. 89(2), pp. 244-245, (2005).
T. Geeraerts, Y. Launey, L. Martin, J. Pottecher, B. Vigu'e, J. Duranteau, and D. Benhamou. Ultrasonography of the optic nerve sheath may be useful for detecting raised intracranial pressure after severe brain injury. Intensive Care Medicine, 33(10):1704-1711, Oct. 2007.
Gopinath SP, Robertson CS, Contant CF, Narayan RK, Grossman RG and Chance B, "Early detection of delayed traumatic intracranial hematomas using near-infrared spectroscopy", J Neurosurg. 83(3):438-44, 1995.
Hansen and Helmke, "The subarachnoid space surrounding the optic nerves: An ultrasound study of the optic nerve sheath," Journal of Clinical Anatomy, vol. 18, pp. 323-328, (1998).
Haider MN, Leddy JJ, Hinds AL, et al. Intracranial pressure changes after mild traumatic brain injury: a systematic review. Brain Inj. 2018;32(7):809-815.
Hastenteufel M, Vetter H and Meinzer I (2009) Effect of 3D ultrasound probes on the accuracy of electromagnetic tracking systems Ultrasound in Medicine & Biology, 32(9), pp. 1359-1368.
Joshi, S et al, A Novel Representation for Riemannian Analysis of Elastic Curves in Rn, Proc IEEE Comput Soc Conf Comput Vis Pattern Recognit. Jul. 16, 2007; 2007(Jun. 17-22, 2007): 1-7.
Joshi et al., (2007) "Removing Shape-Preserving Transformations in Square-Root Elastic (SRE) Framework for Shape Analysis of Curves", Proceedings of EMMCVPR, Springer Lecture Notes in CS, 4679.
Jünger, E. C., Newell, D. W., Grant, G. A., Avellino, A. M., Ghatan, S., Douville, C. M., Lam, A. M., Aaslid, R., & Winn, H. R. (1997). Cerebral autoregulation following minor head injury, Journal of Neurosurgery, 86(3), 425-432.
Kim H, Han D, Kim J, Kim D, Ha B, Seog W, Lee Y, Lim D, Hong SO, Park M, Heo J An Easy-to-Use Machine Learning Model to Predict the Prognosis of Patients With COVID-19: Retrospective Cohort Study, J Med Internet Res 2020;22(11):e24225.

Kennedy P, Wagner M, Castera L, et al. Quantitative Elastography Methods in Liver Disease: Current Evidence and Future Directions. Radiology. 2018;286(3):738-763.
Lee J., Kim S., Dong J., Tae Hyon H., Kim J., "Deformable model with surface registration for hippocampal shape deformity analysis in schizophrenia", NeuroImage, vol. 22, Issue 2, Jun. 2004.
Solberg, et al., "Freehand 3d ultrasound reconstruction algorithms: A review", Ultrasound in Medicine and Biology, vol. 33(7), pp. 991-1009, (2007).
Mehdizadeh, et al., "Introducing the shape of the globe as a predisposing factor for glaucoma," Bioscience hypotheses, vol. 1, pp. 5-8, (2008).
Oyama K, Criddle L. Vasospasm after aneurysmal subarachnoid hemorrhage. Crit Care Nurse 2004; 24: 58-60, 62, 64-7.
Park et al., "Reliability of pulse oximetry in severe hypoxemic children with congenital heart disease," Korean journal of critical care medicine, vol. 12 (1), pp. 65-68, (1997).
Purtill et al., "Validation of a Prehospital Trauma Triage Tool: A 10-Year Perspective," The Journal of Trauma: Injury, Infection, and Critical Care, vol. 65 (6), pp. 1253-1257, (2008).
A. Roche, X. Pennec, G. Malandain and N. Ayache (2001) "Rigid Registration of 3D Ultrasound with MR Images: a New Approach Combining Intensity and Gradient Information", IEEE Transactions on Medical Imaging, (20), pp. 2038-1049.
B Romner, J Bellner, P Kongstad, H Sjoholm, 'Elevated transcranial Doppler flow velocities after severe head injury', Journal Neurosurgery (1996) 85: 90-7.
Robertson, Gopinath and Chance. "A new application for near-infrared spectroscopy: detection of delayed intracranial hematomas after head injury," Journal of neuro trauma, 12(4), pp. 591-600, 1995.
Sloan MA, Alexandrov AV, Tegeler CH, et al. Assessment: transcranial Doppler ultrasonography: report of the Therapeutics and Technology Assessment Subcommittee of the American Academy of Neurology. Neurology 2004; 62: 1468-81.
Sigal et al., "Biomechanics of the optic nerve head," Experimental Eye Research, vol. 88, pp. 799-807, (2009).
Terzopoulos, D. and Fleischer, K, "Deformable models", The Visual Computer 4(6):306-331, 1988.
Tittle A and Flynn C "Correlation of pulse oximetry and co-oximetry," Dimensions of critical care nursing, vol. 16(2), pp. 88-95, (1997).
Tayal, et al., "Emergency Department Sonographic Measurement of Optic Nerve Sheath Diameter to Detect Findings of Increased Intracranial pressure in adult head injury patients," Annals of Emergency Medicine, vol. 49(4),pp. 508-514, (2007).
Vigue, Ract and Benayed, Early SjvO2 monitoring in patients with severe brain trauma, Intensive Care Med 25 (5), pp. 445-451, 1999.
Werner, "Pathophysiology of traumatic brain injury," British Journal of Anesthesia, vol. 99(1), pp. 4-9, (2007).
Yu, Acton, (2002) "Speckle reducing anisotropic diffusion," IEEE Trans. on Image Processing, 11(11), 1260-1270.
Yoo, J., Seo, B.K., Park, E.K. et al. Tumor stiffness measured by shear wave elastography correlates with tumor hypoxia as well as histologic biomarkers in breast cancer. Cancer Imaging 20, 85 (2020).
Yu, Acton, (2003) "Active contours with area-weighted binary flows for segmenting low SNR imagery," Proceedings of International Conference on Image Processing, Barcelona, Spain.- 10.1186/s40644-020-00362-7.
Yu, Molloy, Acton, "Generalized Speckle reducing anisotropic diffusion for ultrasound imagery," the 17th IEEE symposium on Computer-Based Medical Systems, Bethesda, MD, Jun. 24-25, 2004.
Yu, J. A. Molloy and S. T. Acton, "Segmentation of the prostate from suprapubic ultrasound images," Medical Physics, vol. 31, No. 12, Dec. 2004.
Hayreh, S.S. The Role of Optic Nerve Sheath Fenestration in Management of Anterior Ischemic Optic Neuropathy. Arch Ophthalmol. 1990. vol. 108, No. 8, pp. 1063-1064.
Goel et al., "Utility of optic nerve ultrasonography in head injury," Injury International Journal of Care Injured, vol. 39, pp. 519-524, (2008).

(56) References Cited

OTHER PUBLICATIONS

Michailidis, et al., "Assessment of fetal anatomy in the first trimester using two- and three-dimensional ultrasound," The British Institute of Radiology, vol. 75, pp. 215-219, (2002).

* cited by examiner

SET OF CONTOUR SLICES    RECONSTRUCTED 3D SURFACE

SYSTEMS AND METHODS FOR DETECTION OF TRAUMATIC BRAIN INJURY USING COMBINED 3D COMPUTATIONAL MODELING AND ELASTOGRAPHY

CROSS-REFERENCE TO RELATED APPLICATIONS

This application claims the benefit of U.S. Provisional Application No. 63/323,947, filed Mar. 25, 2022, the entire contents of which is incorporated herein by reference.

BACKGROUND OF THE DISCLOSURE

(1) Field of the Invention

The instant invention generally relates to systems and methods for non-invasive measurement and analysis of Optical Nerve Sheath (ONS) distortions as a means for detecting and confirming Traumatic Brain Injuries.

(2) Description of Related Art

Several studies have been dedicated to investigate the dilation of optic nerve sheath (ONS) as a consequence of elevated intracranial pressure (EICP) using ultrasound (US) imaging. Elevated ICP (>20 mmHg) is a clinical indicator for the onset of a moderate to severe traumatic brain injury (TBI) caused due to accidental falls, motor vehicle accidents, blast injury, etc. Majority of these studies compare the ONS diameter (ONSD) measurements (FIG. 1) with 'gold standard' imaging techniques such as computed tomography (CT) or magnetic resonance imaging (MRI) to establish an indirect relationship with EICP and ONSD. Due to a large variation in the baseline ONSD (3.20±1.3 cm) across adult individuals (mean age=38±17 years) it is difficult to set a cut-off ONSD value to classify individuals into normal and TBI patients without compromising on the sensitivity or specificity of the method. Through a study based on serial ONSD measurements and continuous monitoring of ICP levels in trauma patients, it has been observed that ICP and ONSD are poorly correlated (r2=0.61). This poor correlation could be attributed to the limited single plane capture and measurement of nerve sheath geometry (only 2D) and the lack of incorporating tissue properties of the ONS.

SUMMARY OF THE DISCLOSURE

The present disclosure describes a unique method for combining 3D ONS modeling using an H-Transducer with a secondary elastography measurement (shear wave pulse measurement at a fixed depth) to capture strain values within the ONS wall tissue giving a more reliable assessment of both prior and current TBI with, or without maneuvers to artificially increase intracranial pressure (ICP).

3D ONS Shape Analysis:

From 2D US data, it is evident that there is a considerable variation in the diameter measurements across the anterior and posterior sections of the ONS. Additionally, the structure of ONS is also asymmetric along all 3 imaging axes. Subsequently, measuring only the ONS diameter (in the transverse section, perpendicular to the scan plane) need not necessarily predict the instantaneous ICP due to a change in subarachnoid space (SAS)-cerebrospinal fluid (CSF). 3D studies of ONS have been limited to only measuring the ONSD (i.e., still a 2D measurement) in the coronal plane. In 3D imaging, the scanning time is dependent on the size and volume of the region of interest and is not expected to increase more than 1 min. (for trained physicians) and 3 min (for novice medics) in case of the ONS site. Furthermore, studies involving volume measurements such as for nuchal translucency during fetal examination based on 3D data have proven to be more accurate than using 2D data. Similar 3D studies have been extended to explore the changes in shapes of sclera and cornea for a given range of intraocular pressure (TOP) changes. The results of the 3D shape analysis of the eyeball (mainly sclera and cornea) to rapidly classify patients with glaucoma or other ocular pathologies has been encouraging to look at the 3D shape analysis of the optic nerve sheath.

3D ONS Rigidity (Elasticity) Analysis

Our expectation is that by accounting for both geometry (volume) and material (elasticity) distribution of the ONS, one can acquire a robust indicator which can predict elevated, or transient increase in ICP with greater accuracy.

Pressure vessel is a closed container that houses liquids or gasses at pressures different from atmospheric pressure. Therefore, the ONS which houses the CSF can also be considered a cylindrical-pressure vessel. The dural sheath of the optic nerve, which forms the wall of the ONS is less than one tenth the size of the ONSD (mean ONSD=3.20±1.3 cm). This observation justifies the consideration of the optic nerve sheath as a thin-walled cylindrical pressure vessel.

Any change in pressure inside the ONS due to transient increase in ICP is a function of both the nerve sheath geometry as well as its material properties. Since using only the ONSD as an indicator of increased ICP, the material-based compensation of the dilation is ignored. Tissue with a high Young's Modulus (E) will cause a lower dilation for the same change in ICP compared to a tissue with a lower E. Therefore, we can develop a more reliable biomarker by accounting for both tissue elasticity and geometric changes across the 3D ONS model. An ultrasound device can be used in elastography mode to capture the strain values across a given tissue (here, the ONS). In the past decade, shear wave elastography has gained clinical significance in the diagnosis of liver fibrosis and breast cancer.

Extending 3D ONS Measurements to Mild TBI:

A systematic review published in 2018 has documented conclusions from multiple human studies which rely on indirect ICP measurements (MRI and US-derived measurements) in mild TBI or concussed patients/players as well as animal model studies (sport and blast models of concussion). These studies typically report an elevation in ICP after inflicted trauma and return to baseline levels at 7th day (typically, seen in average concussed patients). The review concludes by encouraging research in developing sensitive, modern indirect methods to monitor ICP longitudinally after mild TBI and correlate with resolution of clinical signs, symptoms and functional outcomes.

Through our latest porcine model studies, we have demonstrated both ONS shape (FIG. 2) and elasticity (FIG. 3) changes with transient ICP changes (typically, seen in mild TBI models elevated ICP<3*baseline ICP) depicting compromised cerebral autoregulation and cerebral vasculature. The use of both ONS dilation and elasticity/rigidity in our study coincided with Cartwright et al. Earlier studies have established that ICP and cerebral vasculature changes in mild TBI can be captured by transocular US and Doppler methods. We received a high correlation with both ONS diameter (D) and elasticity (E) changes with transient increase in ICP modeling onset of mild TBI (FIGS. 4 and 5). Our proposed technique of deriving biomarkers from 3D imaging of the ONS can therefore be used for mild TBI and potentially for the entire spectrum of TBI.

Multi-Modal System for TBI Detection:

Manifestation of moderate or severe TBI is highly temporal in nature and its progressions affect several pathways simultaneously. While dilation of ONS is one of the easily measured metrics for EICP, there are other cranial parameters that may also vary with progression of TBI (Monroe-Kellie doctrine). For example, it has been found that in TBI patients, cerebral oxygenation must be monitored when ICP monitoring is contraindicated or not readily available to assess cerebral ischemic risk. Of all parameters that can affect cerebral oxygenation, cerebral blood flow (CBF) and arterial oxygenation ($SaO_2$) can be determined using non-invasive techniques. Consequently, researchers have also investigated the relationship between invasive and non-invasive measurements of different cerebral parameters in severe trauma patients. Studies (Park and Bang, Title and Flynn) report a moderate to high correlation (0.67-0.89) between finger-probe pulse oximetry $SpO_2$ and ICP. Transcranial Doppler (TCD) measurement studies have shown pulsatility index (PI) to be well correlated with CBF in the first 24 hours post-trauma. These studies have established PI value to accurately predict a patient's recovery outcome at 6 months post-injury. These studies emphasize the need to identify non-invasive sensors that can assess different cerebral parameters (ICP, cerebral perfusion pressure (CPP), CBF, mean arterial pressure, etc.) for accurate and rapid diagnosis of TBI.

Data Acquisition Using Ultrasound and Shear Wave Elastography:

Initially, the proof-of-concept of acquiring 3D ONS images was performed using the Metritrack device system [Met22] that utilizes electromagnetic (EM) sensors along with standard 2D US transducers. The post-processing and ONS biomarker extraction steps were performed on a sequence of temporal and spatially-registered 2D images.

Due to the system being less portable, we moved from using EM sensors to inertial motion unit (IMU) sensors. Although use of IMU sensors made the system portable, the sensors needed calibration across days which makes it less user-friendly in a clinical setup and along sidelines.

We then demonstrated a proof-of-concept of extracting shape and elasticity biomarkers from 3D ONS models reconstructed from data acquired using a unique H-transducer based US system (FIGS. 6-7). Since the H-transducer system consists of three ultrasound transducers placed in an H-configuration, the side images captured from the side transducers can be used to compute spatial shift and orientation information. This information is then applied to the corresponding center transducer-images to create a spatially-registered 2D stack of images (FIG. 9). Use of H-transducer for our TBI screening application eliminates the need for additional positional sensors.

The same device is used in elastography mode to collect 2D shear wave elastography (SWE) information. High amplitude pulse for a very short duration is sent out from all the transducer elements. The timing of pulse sequence is to obtain a strong signal at a given fixed (preset) depth in the tissue.

Innovation 1: 3D Ultrasound (US) Imaging of the ONS

Extensive work has been conducted to study ONS histology by Hansen and Helmke in connection with US ONSD measurements. From their study, it was evident that there is a considerable variation in the diameter measurements across the anterior and posterior sections of the ONS. As a result, a single measurement of the ONSD (in the transverse section, perpendicular to the scan plane) does not necessarily predict instantaneous changes in ICP. Encouraged by this effort, we developed both pre-processing and post-processing algorithms to reconstruct the full 3D model of the ONS from 2D US images.

Innovation 2: 3D ONS-Derived TBI Biomarkers

We are currently investigating biomarkers (namely, diameter and elasticity) derived from the ONS model that better correlate with ICP than a traditional 2D ONSD (FIGS. 4 and 5). The candidate biomarkers (ONS shape and elasticity) can also be used to track recovery from a mild TBI episode and therefore, provide an objective and robust measure to make return to play/duty decisions.

Innovation 3: Multi-Modal TBI Detection System

To date, no comprehensive study with potential non-invasive TBI markers has been conducted to investigate their combined effect on diagnosis or patient outcome. We may investigate a range of sensors apart from the US such as TCD, DCA, $SpO_2$, blood pressure, etc. and study their relationship with direct measurements of ICP, CPP, CBF and MAP. Our choice of measurements is dictated by their clinical relevance and also the feasibility to acquire them in an ambulance/emergency situation by EMTs. We therefore extend the core-US imaging solution to multimodal sensing technology to provide a more holistic TBI diagnosis.

Innovation 4: Decision-Support System (DSS)

The machine-learning (ML) models in the DSS provide classification on the onset of TBI, predict recovery time point and monitor recovery based on ultrasound-derived ONS biomarkers. The DSS can be extended to multiple biomarkers from other proposed noninvasive sensors in Innovation 2.

Innovation 5: Visualization Dashboard

We have developed a user interface to display the results from our post-processing routines and the DSS. The visualization dashboard (FIG. 17) can assist the physician to review the computed 3D ONS model and the biomarker values for a given patient.

It can thus be appreciated that the exemplary embodiments provide a unique method for combining 3D ONS modeling using an H-Transducer with a secondary elastographic measurement (shear wave pulse measurement) to capture strain values within the ONS wall tissue giving a more reliable assessment of both prior and current TBI with, or without maneuvers to artificially increase intracranial pressure (ICP).

BRIEF DESCRIPTION OF THE DRAWING FIGURES

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

Figure 16:
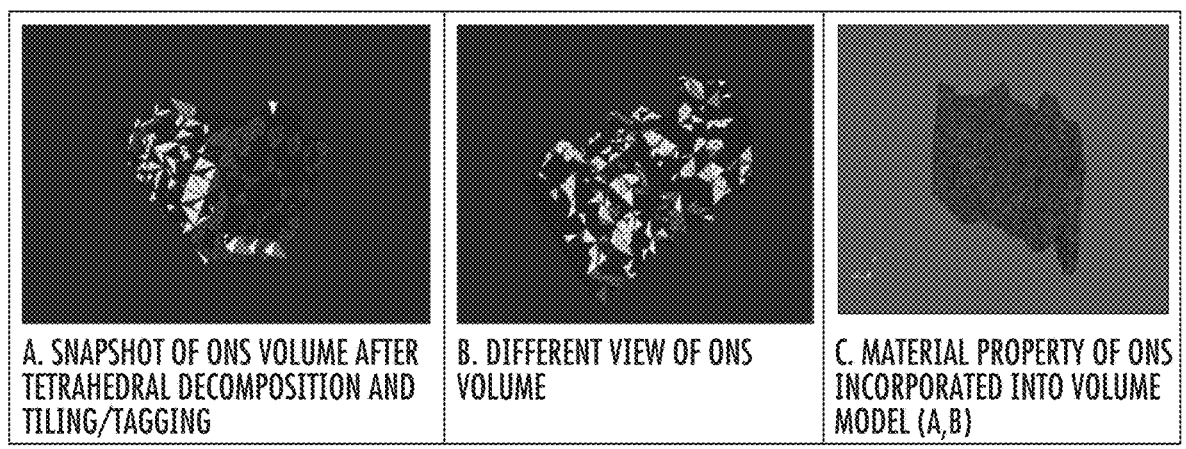
Figure 17:
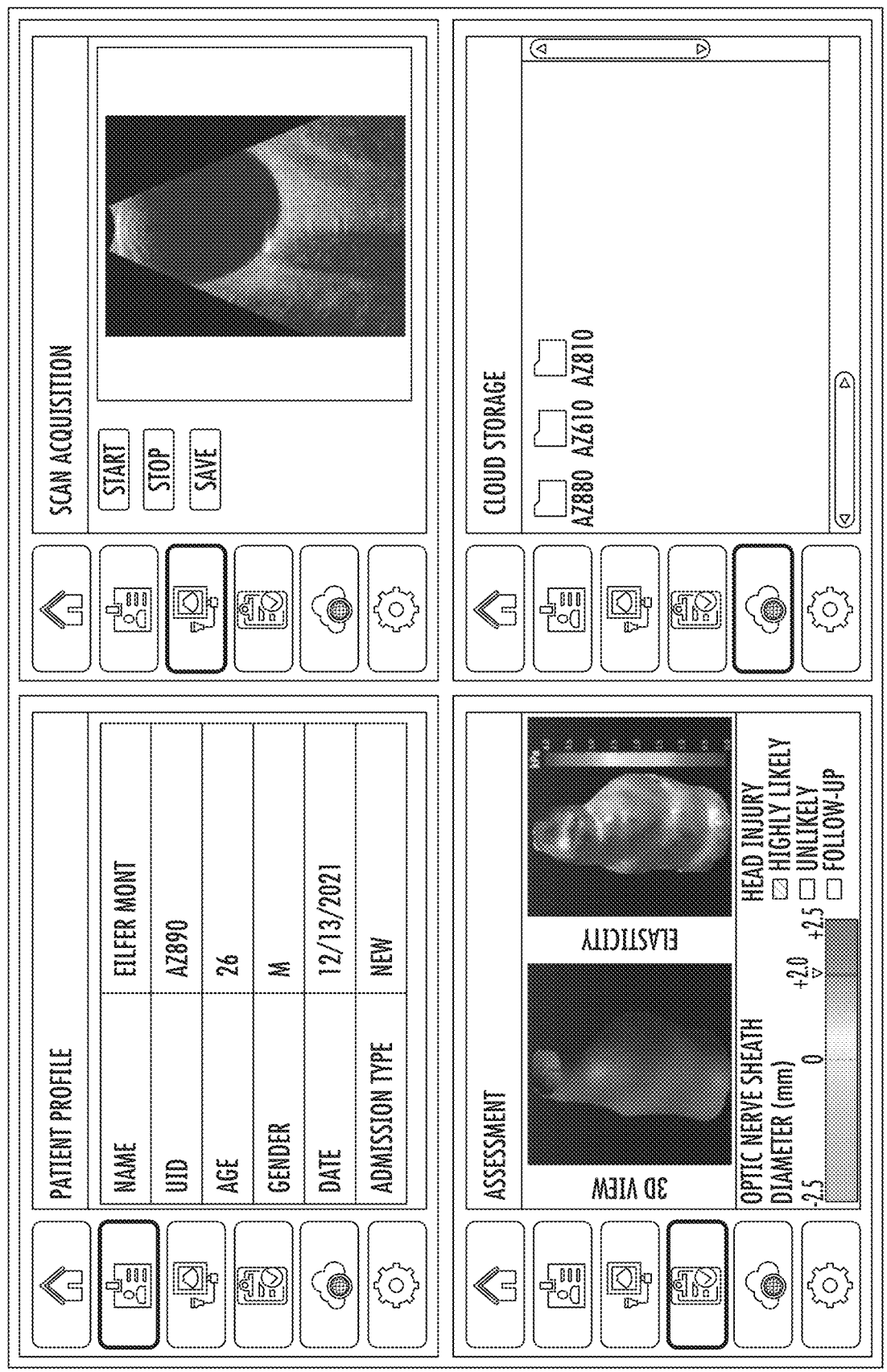

FIG. 16 illustrates tetrahedral volume modeling to study the distribution of intensity values and 3D geometry of the ONS to develop robust and reliable feature metrics to detect TBI or elevated ICP; and FIG. 17 illustrates a proposed user interface to display images and screen for mild to severe TBI using the candidate ONS-derived biomarker, wherein the system provides an assessment based on a likelihood of injury and its severity based on machine-learning classifiers.

DETAILED DESCRIPTION OF THE EXEMPLARY EMBODIMENTS

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Figure 11:
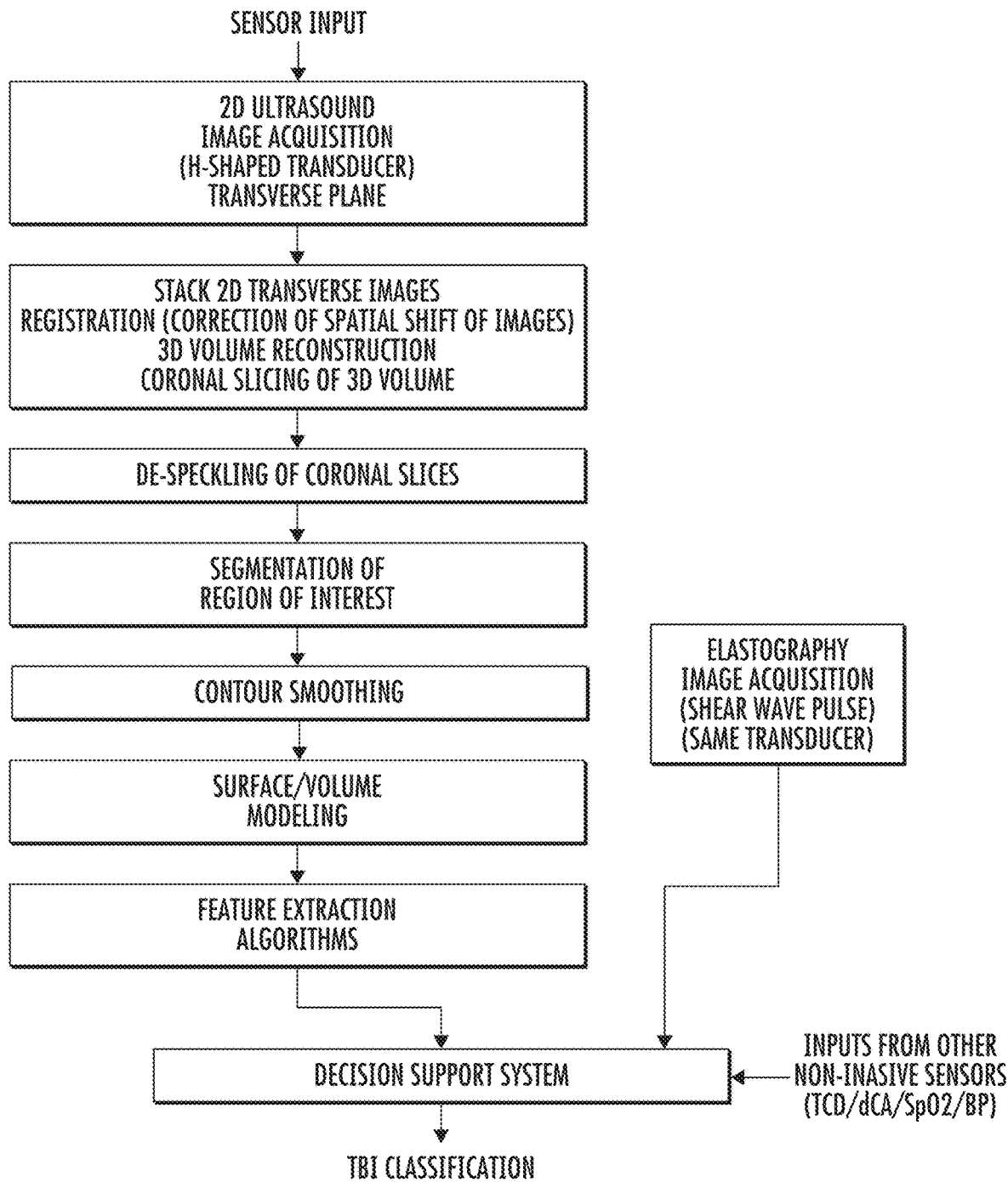
FIG. 11 is a schematic diagram illustrating the various image and decision processing steps involved in assessing a potential traumatic brain injury.

The present disclosure describes a unique set of pre-processing and post-processing algorithms for registering 2D stack of images from H-transducer data, extracting the ONS contours from 2D images, reconstructing the 3D volume and surface models of the ONS, and despeckling of ultrasound images. Once the model is generated, automated shape and volume analysis algorithms are implemented to compute biomarkers (FIG. 11, System Block Diagram).

A suite of machine learning algorithms has been implemented to develop a decision-support system (DSS) that can combine information from ultrasound-derived ONS biomarkers and other sensors (TCD, DCA, $SpO_2$, blood pressure, etc.) to detect and predict the onset of TBI. Within the DSS software, a module can predict recovery time point using a multivariate linear regression model. Both the decision-support and prediction module have to be validated on trauma patients. The following provides a detailed description of the various pre- and post-processing algorithms developed and/or customized to create an end to end solution for TBI screening.

Referring now to FIGS. 6-10, there are illustrated schematic diagrams of the H-Transducer and scanning of the eye to obtain a series of transverse images for analysis and reconstruction.

1) Registration and Stacking:

We consider the center transducer (FIG. 7) to provide us the main set of images (YZ plane; scanning along the x-axis) and the Right and Left transducers to provide us images along the XZ plane, i.e., scanning along the y-axis (Cartesian coordinate). In theory, we only need either the Right or the Left transducer frame images. However, due to hand motion, it is possible to introduce shift along the length of the main transducer, therefore, right and left frame images may be required to compute average X-shift.

Spatial Shift Calculation Algorithm

We first calculated the translation and rotation shifts across YZ main frames (each YZ image size=192×128 pixels; total 128 frames). These shifts are calculated between consecutive frames.

We then use XZ frames (here, left transducer) to compute X shift (each XZ image size=192×128 pixels; total 93 frames). These shifts are also calculated between consecutive frames.

The average of X-shift calculated from Left and Right transducer frames is calculated and then applied to corresponding YZ main frames. X-shift calculated between Frame 1 and 2 of XZ images is applied to Frame 1 and Frame 2 of the YZ images and so forth. (The X-shift computation provides the approximate frame position of a YZ frame along the x-axis. The consecutive Frame positions are thereby, updated according to X-shift computed values.)

Now for each YZ image we have X coordinate information as well. So each pixel now has x, y, z information. Once the conversion is established, we have a 3D point cloud ready for volume reconstruction.

Figure 10:
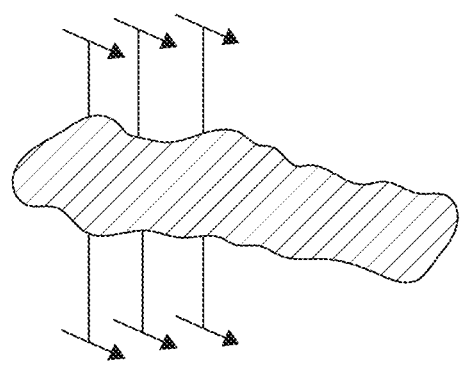
FIG. 10 illustrates the 3D reconstructed image of the ONS and subsequent coronal (cross-sectional) slicing for further processing.

From the now registered images, the stack can be combined into a 3D volume (FIG. 10).

3D Volume Reconstruction Algorithm

We have implemented a forward approach or Pixel Nearest Neighbor (PNN) method. In this method, for the position of each pixel within the B-mode image frames we find the appropriate voxel positions within the volume.

Broadly, the 3D volume reconstruction algorithm steps are listed as follows:

For each pixel find the nearest voxel,

We then assign the intensity value of the pixel to the nearest voxel. If a given voxel is assigned multiple pixel intensities, the average is taken (maximum, minimum, most recent can also be taken).

Since all voxels might not be assigned intensity values, resulting in holes. We then fill the holes using interpolation or 3D nearest neighbor or distance weighted.

Once the 3D volume is constructed, a series of coronal slices (cross-sectional) are obtained (see FIG. 10). These images are then further processed with a series of filter to better define the ONS boundaries and create a further 3D model.

2) De-Speckling Algorithms

Figure 12:
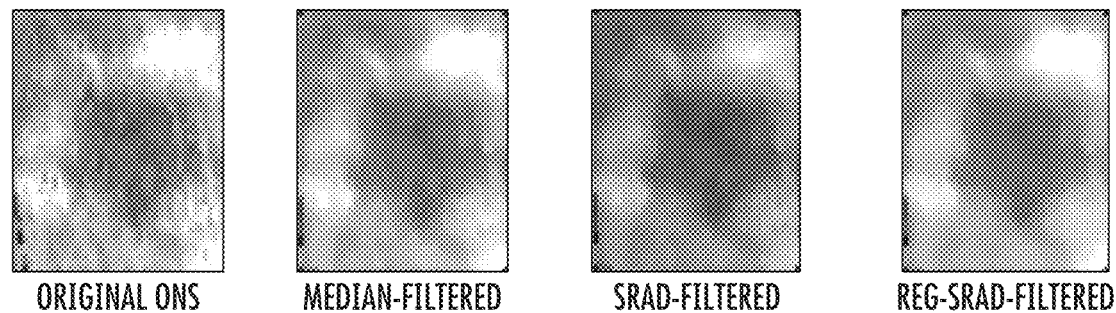
FIG. 12 shows pre-processing (de-speckling) filters applied to the ONS image coronal slices.

A library of de-speckling algorithms have been developed that range from simple straight-forward implementation of kernels to sophisticated algorithms that are expected to be more robust. The following are the de-speckling algorithms that were implemented (FIG. 12, De-speckling output)

2.1. Median Filtering:

This filter is used in digital image processing due to its property for removing noise without shifting/blurring of region of interest (ROI) boundaries. Although, median filter is traditionally not used for despeckling, it is still considered as a candidate filter compared to other noise-removal algorithms. The kernel size is a variable that needs to be determined based on the ROI. A bigger kernel size (greater than ROI size) will merge the ROI with the background; on the other hand, a smaller kernel size will require multiple iterations (more computation time) to remove noise from the ROI. Based on our ROI size (ONS in the coronal plane is approximately 20×20 pixels), a kernel size of 11×11 was selected by visibly evaluating the output on multiple slices.

2.2. Speckle Reducing Anisotropic Diffusion (SRAD) Algorithm:

SRAD algorithm is suitable for real time hardware implementation to discern the underlying cross sections of tissues efficiently and accurately. The SRAD algorithm is a partial differential equation (PDE) approach to remove speckles for enhancement of US images. SRAD smoothens the imagery and enhances edges by inhibiting diffusion across edges and allowing isotropic diffusion with homogeneous regions. The approach employs the instantaneous coefficient of variation (ICOV) to measure the strength of edges in speckle imagery.

2.3. Regularized-SRAD (Reg-SRAD) Algorithm:

To improve performance of SRAD for point/linear features, we introduced a novel regulator called energy condensation integral and developed a regularized SRAD (Reg-SRAD) via minimization. The Reg-SRAD generates outputs with increased resolution for point and linear features while retaining the characteristics of the SRAD— filtering speckle with regional features enhanced.

Figure 13:
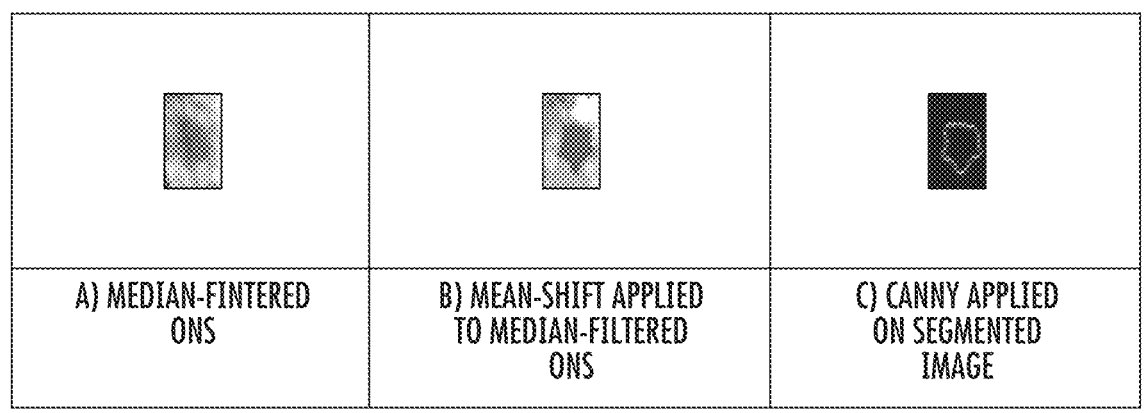
FIG. 13 shows further processing including median filtering (a), followed by a mean-shift filter (b), and finally a canny filter applied to the segmented image prior to 3D modeling.

3) Segmentation Algorithm:

Most of the state-of-the-art segmentation algorithms are semi-automated (requiring manual intervention to choose seed points) and are image- and noise-specific. Based on our literature review, we finalized on the mean shift clustering algorithm that has been applied for segmentation of ultrasound images, low-level vision problems and multi-class object segmentation (FIG. 13, Segmentation output). The advantage of the algorithm is that it requires no user input and is computationally efficient. The algorithm treats the points in the d-dimensional feature space as an empirical probability function where the dense regions (cluster of points) in this space, in general, correspond to local maxima or modes. The aim is to find or locate the root or the mode (centroid) of these cluster points. The search is initiated by implementing a gradient ascent approach on the local estimated density until the search converges. The points having the same root or mode are considered as belonging to the same cluster.

Figure 14:
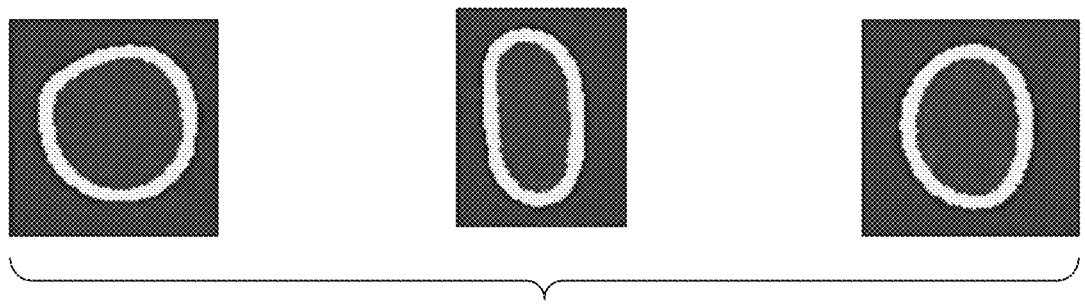
FIG. 14 shows contour smoothing of several images including a rag-fit output (outer ring) overlaid on the actual ONS contour (inner circle)

4) Contour Smoothing Algorithm:

Rational of Gaussian (RAG) fit has been conventionally designed to extract geometry from dense and noisy datasets. In this surface fitting method the standard deviation (sigma) of the Gaussian curve is used as a smoothing parameter. The higher the sigma value, the smoother the resultant surface; by adjusting the sigma value of the Gaussian curve one can control the curvature of the resultant surface. This is an improvement over the more popularly used NURBS method, which has fixed basis functions. However, in comparison to the NURBs method which has a fixed computation time, irrespective of the number of input control points, the computation time of the RAG fit method is dependent on the number of input data points. Although, computation wise, RAG fit depends on the number of input points that needs to be made smoother, for our application, we can assume the time to be constant and negligible since the US images have a fixed size (FIG. 14, Contour smoothing output). The output (smooth-segmented ONS 2D contours) of the RAG fit algorithm serves as inputs to both surface and volume modeling algorithms.

Figure 15:
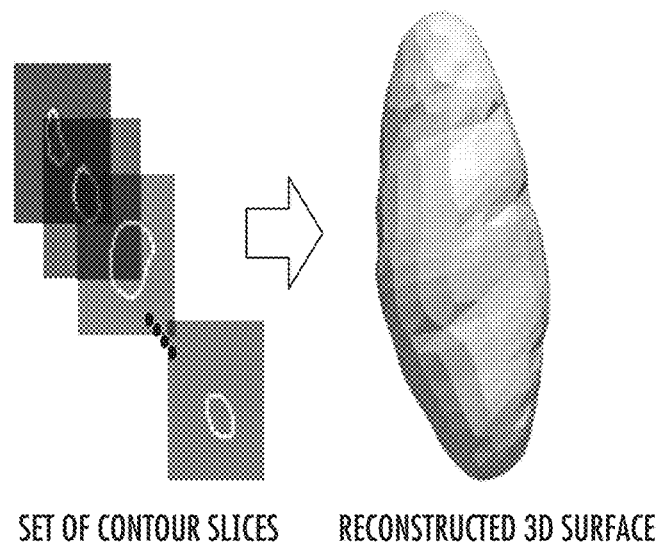
FIG. 15 illustrates an example of a surface reconstruction from a set of processed contour slices.

The following sections 5) and 6) describe the post-processing algorithms that we applied to generate 3D ONS model:

5) Surface Modeling Algorithm:

Once the individual ONS contours have been segmented and smoothened, the surface model is built from these contours (FIG. 15). However reconstructing the surface from contours is not straightforward. In the process of contour extraction, the coordinate functions of successive contours may not always be aligned with respect to each other. This can produce spurious breaks and tearing in the surface, even when the global appearances of the curves look consistent (Surface modeling output). Thus we need to take into account the successive shape invariances present in curves when augmenting them to reconstruct a surface. We first fix some notation, and then present an algorithm for surface reconstruction. Let the set of segmented curves from the ONS slices be defined as $\{\beta_i\} j=1, \ldots N$, where N is the number of slices from the B-mode ultrasound images. Since these curves will be closed curves, we modify our previous definition to define $\beta$ along a domain identified by a unit circle. Thus, $\beta(s): S^1 \to \Re^3$, for each $s \in [0,2\pi]$. We also note that any change of origin along the curve does not change its shape. In other words, the shift in origin along the curve is a nuisance variable and needs to be removed when constructing the surface. We thus define a reparameterization action due to shift in the origin on the curves as follows. Any change in the starting point of the curve $\beta$, is represented by the action of the unit circle $S^{-1}$ on $\beta$ as $r \cdot \beta(s) = \beta((s-2\pi)_{mod 2\pi})$ for $r \in [0,2\pi)$, with 0 and $2\pi$ identified. We now define a $L^2$ norm to detect the discrepancy in the starting point between two curves as follows: Given two curves $\beta_i$ and $\beta_{i+1}$, the origin that minimizes the reparameterization error between them is given by $$\operatorname{argmin}_r \|\beta_i(s) - r \cdot \beta_{i+1}(s)\|^2.$$

Thus the optimal starting point between the two curves is given by $$\hat{r} = \mathrm{argmin}_r \|\beta_i(s) - r \cdot \beta_{i+1}(s)\|^2.$$

The reparameterized curve is then given as $\hat{\beta}_{i+1} = \hat{r} \cdot \beta_i$. The mesh geometry of the ONS surface is represented using a set of simplicial complexes. For instance, given a surface manifold M with a spherical topology, we represent it by the set of function (K, f), where f: K→M is a function defined on M.

6) Volume Modeling Algorithm:

A novel tetrahedral decomposition algorithm is disclosed for volume rendering of ONS (FIG. 16, ONS volume model) and other anatomical structures of interest. The suite of functions to provide a high-resolution volume of ONS is presented as follows:

6.1. 3D Tetrahedral Decomposition:

Extending the 2D triangular decomposition briefly discussed above to 3D, the cube and tetrahedron replace the square and the triangular tile. The decomposition of the cube requires two stages. The initial decomposition of the cube leads to six isomorphic (under rotation and/or reflection) tetrahedra which form the leaf-nodes of a coarse binary tree. These tetrahedra are orthogonal in form as three of the consecutive edges are parallel to X, Y and Z axes. The second (so called refinement decomposition) stage takes the coarse leaf-nodes generated in the first stage of decomposition and recursively applies binary tetrahedral decomposition to generate finer orthogonal tetrahedra. At varying depths of the decomposition tree some number of these refined tetrahedra which are either fully or partially located in the interior of ONS, and each with at least one of its facets close to the ONS surface boundary subject to a predefined error tolerance is ordained to permanently terminate the process of orthogonal decomposition or else and if necessary switch to non-orthogonal binary decomposition in order to capture greater fidelity in representing the local surface geometry of the ONS. Regarding the interior tetrahedra, the orthogonal decomposition continues until the pressure variation inside each tetrahedron falls within a threshold at which point further decomposition of the tetrahedron is terminated. Any tetrahedron found to be located in the exterior of ONS gets terminated for further decomposition. This method has obvious advantages as it avoids unnecessary decompositions and gives higher resolution where needed. The storage requirements as well as the time consumed increases exponentially with increasing levels of decomposition. Hence, it is prudent to avoid excessive computations. Our encoding of the tetrahedra also allows us to store only a fraction of the data needed to represent a tetrahedron thereby minimizing storage consumption.

6.2. Interpolation:

In some cases, we need a higher level of decomposition that cannot be afforded by the given set of points. We need to expand the images by using interpolation between the sets of points to create new data points. Different interpolation techniques can be used. We have used a standard linear 2D interpolation technique. However, more complex techniques like spline interpolation can also be used in the future.

6.3. Tiling and Tagging:

We can group the tetrahedrals based on connectivity once we reach the leaf node of the tree structure. However, this method would be time consuming and is not a practical solution. We therefore cluster the tetrahedra depending on the tagging of their respective surfaces. Also, we use only those tetrahedra which are the leaf nodes of the decomposition tree. Thus, at the end of the splitting process, we know which tetrahedra are connected to one another to form the 3D ONS volume.

7) Feature Extraction:

The following are the feature-extraction algorithms implemented to derive biomarkers from 3D ONS models.

7.1. Geometric Deformable Models:

Deformable models have been used in the medical imaging community for the last decade and are growing popular due to their modeling of elastic objects under dynamical forces and constraints. Typically, deformation energy functions defined in terms of the geometric degrees of freedom are associated with the deformable model. The energy grows monotonically as the model deforms away from a characteristic shape and often includes terms that constrain the smoothness or symmetry of the model.

Recently a deformable approach has been used for analyzing hippocampal shape deformity in Schizophrenia. For the ONS, we start with a parameterized surface representation of a triangular mesh. Given two such surface representations (subject) and (template), we then define displacement vectors as that measures the deformation between the subject and the template.

A set of these deformation vector fields is computed over the whole surface, and then aligned using both coarse and fine principal component analysis. The statistical analysis on this set of deformation fields characterizes the shape differences between different ONS representations.

7.2. Laplacian Eigen-Spectrum Signatures:

An alternative to the deformable surface model is analyzing characteristic spectra of the surface shapes and comparing the spectral information between two different models. The difference between the spectral and the deformable approach is the ability to characterize combined global and local features of surfaces. It has been proposed to use the Eigen-functions of the Laplace Beltrami operator of the 3D surface for characterizing shapes. Since this spectrum is invariant to isometries, it is independent of the object's representation including parameterization and spatial position, and thus can be considered as an intrinsic geometric property of the shape. Additionally, the normalization of Eigen-values also helps in the uniformly scaling of the geometric features of the shapes. Apart from deformable modeling of the ONS, the use of shape spectrum analysis of the ONS using Eigen-shapes has also been investigated, and attempted to determine population or group differences between various ONS subjects based on the shape spectra.

7.3. Curvatures and Moment-Based Descriptors:

In addition to the Eigen-Spectrum of the shape, we also propose to use relatively simple moment-descriptors for 3D shape analysis. The advantage here is the computational and representational efficiency of the moment-based shape descriptors. The idea is to obtain a compact numerical representation of the spatial surface features for the ONS in terms of the characteristic moments of the shape. These moments involve the use of orthogonal polynomials, such as 2D/3D Zernike moments and Legendre moments, and allow the construction of shape descriptors with little or no redundancy. Thus the original shape can be subsequently reconstructed from its moments with varying degree of precision. The traditional 2D moments have been extended to 3D and later used for shape retrieval. The shape analysis of the ONS using moments proceeds as follows. As an initial step, the center of gravity of the ONS volume is computed and then shifted with respect to the origin. We then scale up the ONS volume to map its curvature to the unit ball constant curvature. Subsequently all geometric moments can be computed and used in the ensuing analysis.

7.4. Elasticity (E):

The optic nerve sheath (ONS) is a walled structure which is defined by inner supporting structures, called trabeculae that hold the ONS to the optic nerve. The space (subarachnoid space (SAS)) in between trabeculae is filled with cerebrospinal fluid (CSF).

The structures of the ONS can be damaged by an increase in ICP caused by an acute head injury. As is known from prior work in the field, the ONS is part of the central nervous system and contains circulating cerebrospinal fluid, and an increase results in damage to the trabeculae, weakening the ability of the trabecula to hold the ONS to the optic nerve and to maintain wall integrity. After the ICP returns to normal and the ONS returns to its normal size Recent studies of in vivo human ONS's show that following a significant initial increase in ICP the ONS never returns to the structural integrity of the preinjury ONS. Elastography is an imaging modality that maps the elastic properties and stiffness of soft tissue. By measuring the ONS tissue stiffness, a precise measurement of the ICP can be measured.

As an adjunct imaging modality, the present methodology utilizes a fast imaging sequence of a given region of interest to capture elastography information after transmitting a shear wave pulse using the same H-transducer. The transducer is used in conventional B-mode to identify a particular area of interest and then switch to a shear pulse mode to obtain a series of images during the shear pulse.

Figure 1:
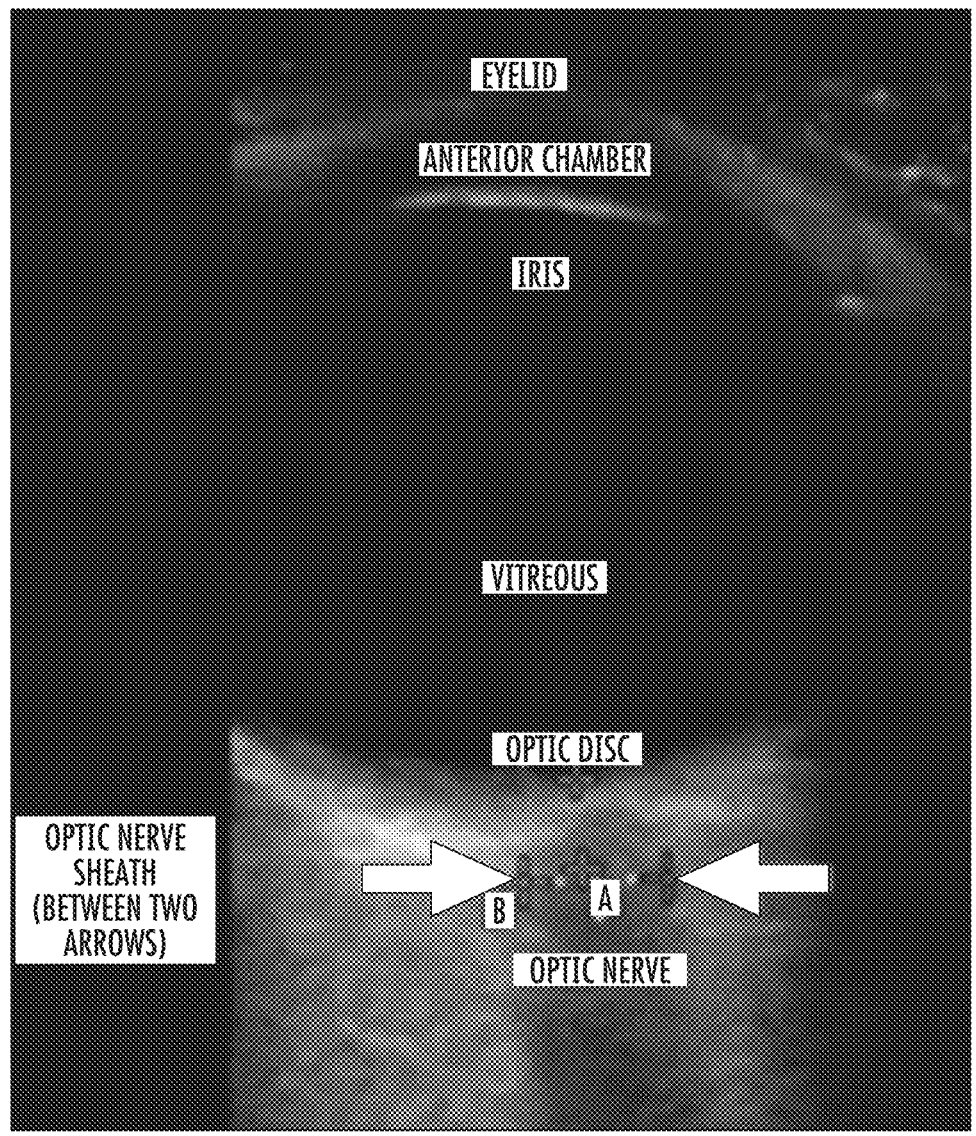
FIG. 1 is a standard 2D ultrasound image of the eye with the Optic Nerve Sheath (ONS) within the arrows and the ONS diameter is measured using a digital caliper by the end-user approx. 3 mm behind the eye globe.
Figure 2:
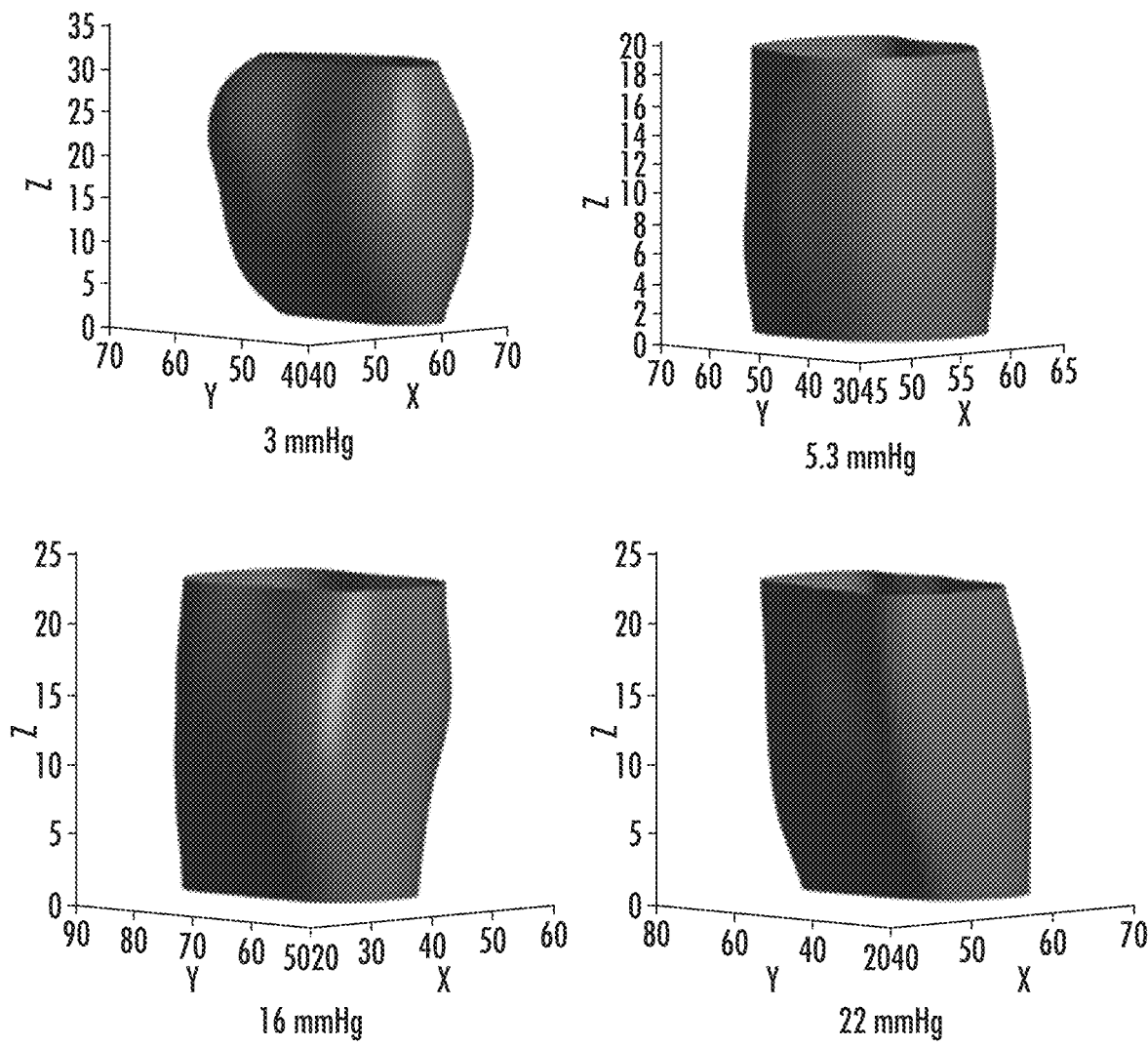
FIG. 2 illustrates ONS model reconstruction at different intracranial pressure (ICP) levels.
Figure 3:
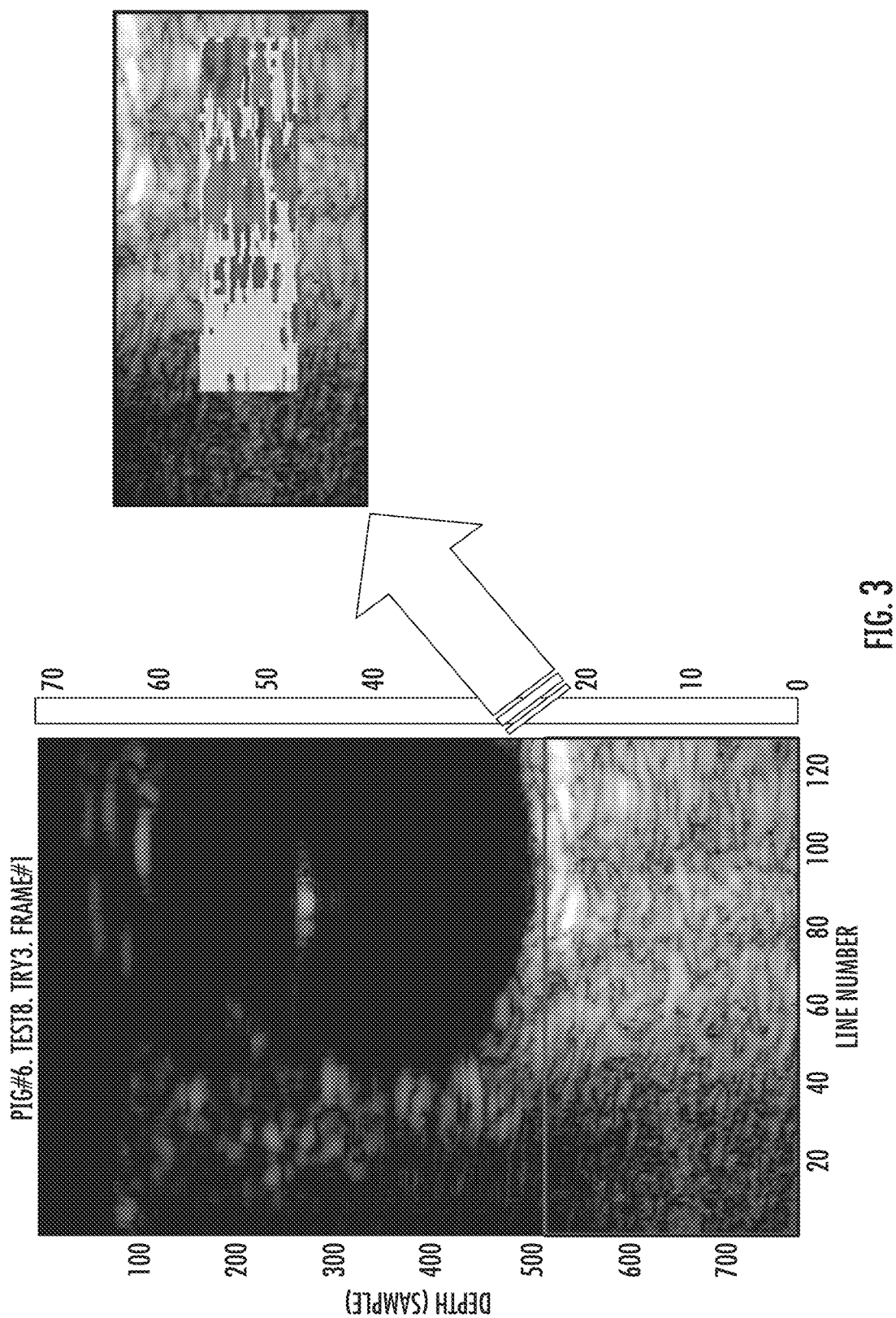
FIG. 3 shows images illustrating a candidate region of the ONS to evaluate the strain (stiffness) values (elastography) (see the shaded data on the right that shows the strain values in kilopascal)
Figure 4:
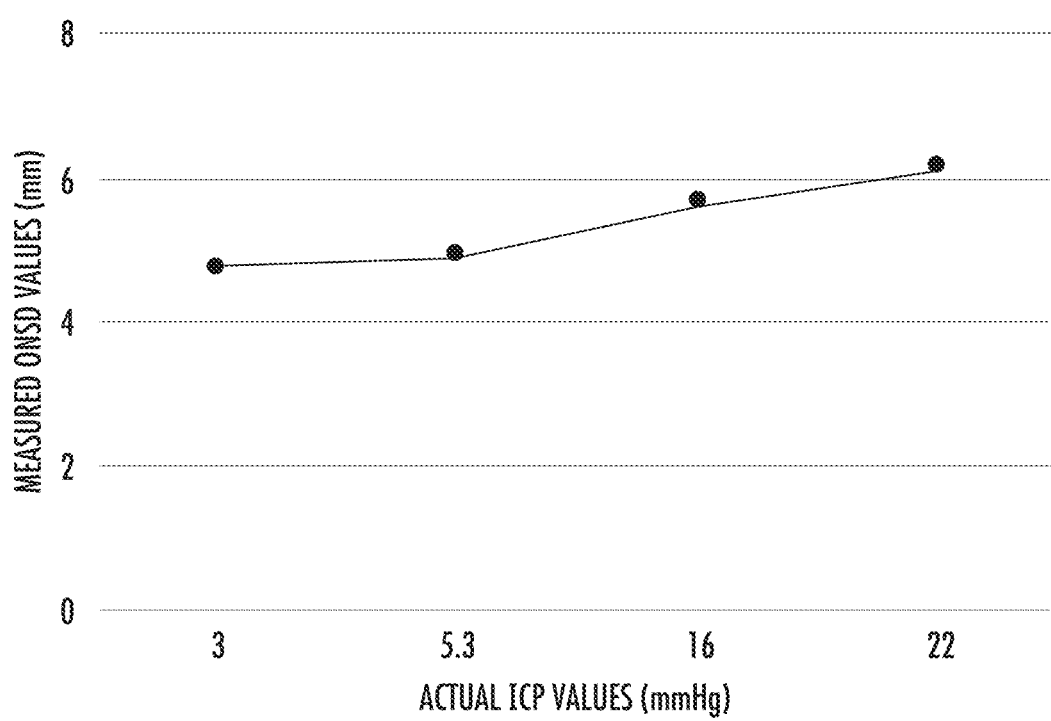
FIG. 4 is a graphical illustration of correlation (0.99) reported between ONS diameter measured 3D ONS scans (mm) and the actual ICP level (mmHg)
Figure 5:
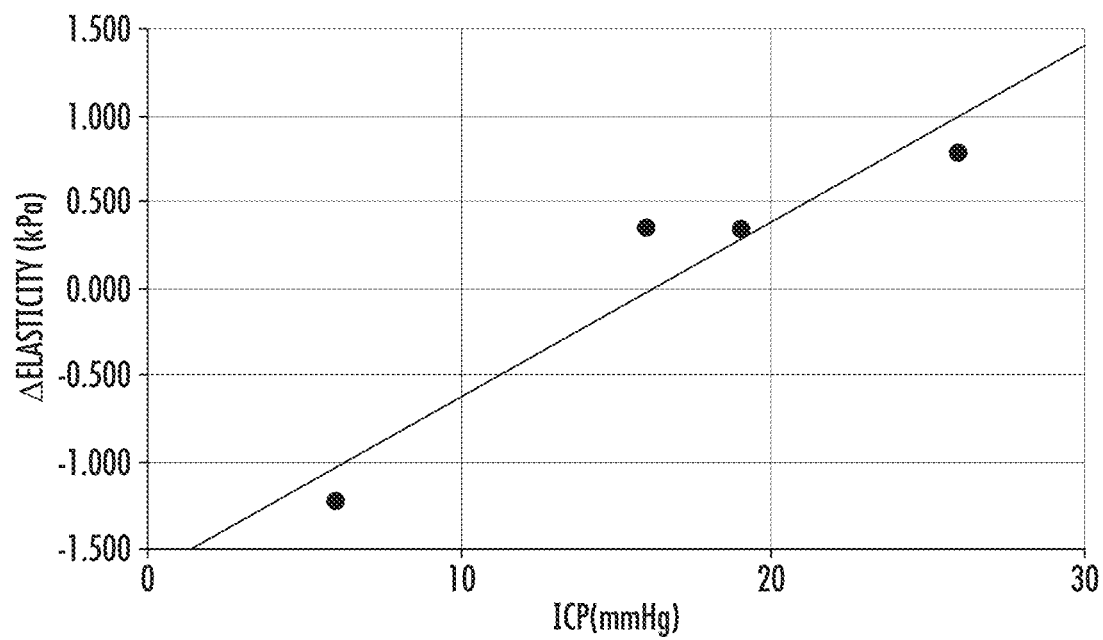
FIG. 5 is a graphical illustration of correlation (0.99) reported between ONS elasticity measured from 2D shear wave (elastography kPa) and the actual ICP level (mmHg)
Figure 6:
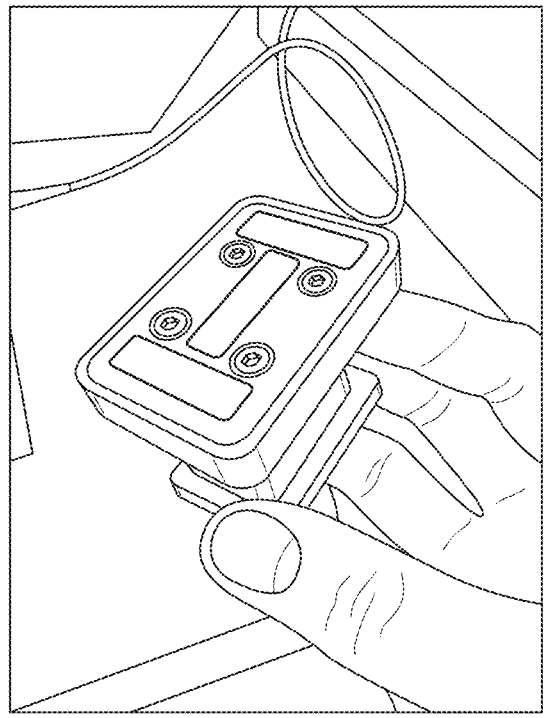
FIGS. 6 and 7 are illustrations of the H-shaped transducer used in the present image acquisition methodology.
Figure 7:
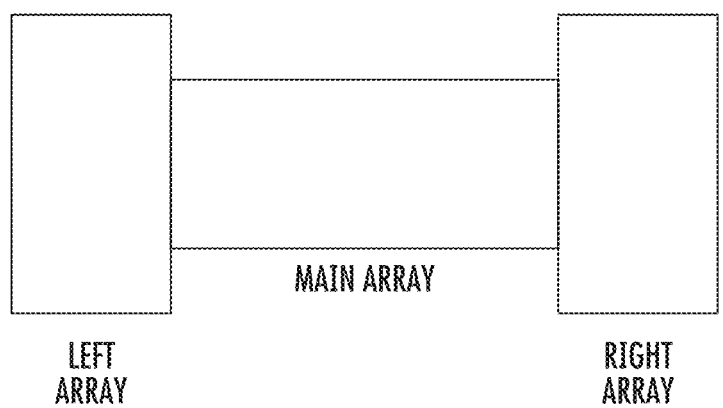
Figure 8:
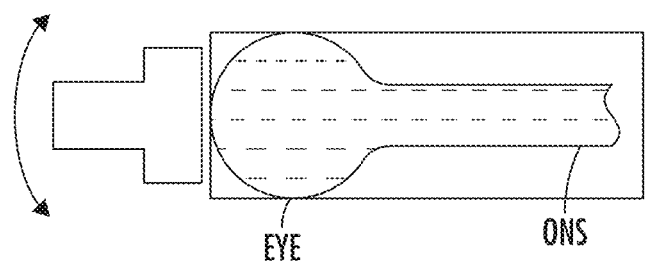
FIG. 8 is a schematic illustration of a scanning process for obtaining a series of transverse 2D images.
Figure 9:
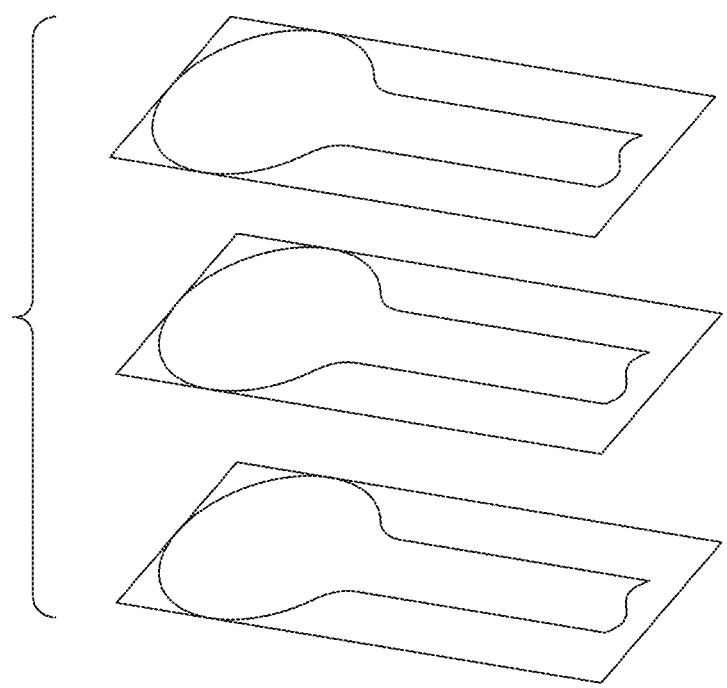
FIG. 9 is a schematic illustration of stacking the transverse images.

Using cross-correlation method, the received signal across multiple frames are overlaid to improve the signal to noise ratio. The signal is color coded to visualize the strain (elasticity) values across regions of interest and overlaid on a 2D image (see FIG. 3).

The present methodology seeks to address sometimes confusing and contradictory measurements and behavior of the ONS seen in conventional 3D modeling based on the status of the injury as a first injury and/or during a subsequent injury to better identify current injuries. Prior methodologies require a maneuver to artificially increase ICP so that differences in the ONS diameter can be observed. However there are shortcomings with this method. The first being that artificially increasing the ICP with a maneuver can be dangerous and make the injury worse in the case of a serious injury.

1) For a normal person before and after maneuver, the ONSD will be in normal limits. Pressure on ONS will be within normal limits.

2) During a first concussion episode, before and after a maneuver, the ONSD will be greater than normal limits. The two ONSD measurements may not positively indicate injury since there may be no perceived difference in the ONSD other than perhaps increased diameter. However, the range of "normal" is dependent on age, weight, sex and other factors, so this is not entirely determinative for a first injury.

However, pressure on ONS will be HIGH.

3) Six months after a first concussion, a person's ONSD after a maneuver will be greater than normal limits (perhaps indicating a persistent injury despite some recovery). However, before a maneuver, the ONSD will be within normal limits.

Pressure on ONS will be normal.

4) If a second concussion occurs then before maneuver, the ONSD will be high and pressure on the ONS will be high.

As noted above, the ONSD measurements by themselves may be confounding and not determinative even with a maneuver.

However, elastography measurements indicating a high ICP is almost always indicative of a current or ongoing injury.

Accordingly, in all scenarios it may no longer be necessary for the patient to perform a maneuver to artificially increase the ICP so that the ONSD can be measured. Using a Machine Learning Decision system as will be described below, a steady state measurement of both ONSD combined with an elastography measurement and ICP can now more accurately indicate TBI in all scenarios.

Nevertheless, the current disclosure also supports a methodology which includes a pre-maneuver scan and a post maneuver scan to further increase reliability.

8) Machine-Learning Based Decision-Support System:

Our DSS has different machine-learning based modules for injury classification, tracking recovery from a TBI and predicting return to play time point.

In an exemplary method, the ONSD, elastography soft tissue data and ICP are provided to the machine learning decision system for analysis and to determine a discriminatory outcome of a traumatic brain injury based on the combined ONSD, elastography and ICP. Additional data points from other non-invasive sensors such as TCD, dCA, SpO2 and Blood Pressure (BP) may also be input into the system for added variables.

Upon completion of the decision system analysis, the system displays a graphical representation of the discriminatory outcome (YES or NO).

8.1. Machine-Learning (ML) Models for TBI Classification:

In the pattern recognition and machine learning (ML) domain, there are many different classification techniques, including Neural Networks, Naïve Bayesian classifier, Bayesian Networks (BN), Decision Trees, Support Vector Machines, Decision Forests, etc. However there is so far no superior technique that can outperform all others in general problems. It is arguable to say that different techniques behave quite differently and each of them actually is suitable for some specific problems.

However, for clinical rule-based systems that aid clinicians/experts to make decisions on a particular case, decision trees are in general the preferred option. Due to the nature of these trees, i.e., the branches (rules) are highly data-dependent (over-fitting) and provide a discriminatory outcome (binary classification: Yes or No) and are therefore termed as 'discriminatory' classifiers. On the other hand, Bayesian network models are generic in nature, in the sense that they can perform even with missing data (loosely fit') although their performance may or may not be at par with more discriminant decision trees when all sensor readings are available. We have implemented both 'discriminative' (decision-tree) and 'generic' classifiers (BN algorithm) to classify simulated data.

The US data (ONS shape and elasticity-based features, Section 7) collected on actual mild TBI cohorts will be used to train and validate these proposed ML models.

8.2. ML Model to Classify Recovered Patients:

The ML model developed to classify patients based on point of injury data in Section 8.1. can also be used to classify recovery from mild TBI using post-injury US (ONS shape and elasticity) measurements. US measurements will be collected along with clinical measures as listed in standard return to play/duty protocols at specific intervals to monitor recovery.

8.3. Prediction Model to Track Recovery from Mild TBI:

A multivariate model that incorporates point of injury ultrasound data along with clinical measures can be developed to predict the recovery time point in a mild TBI cohort. The model can be trained to determine if the recovery will occur in less than 1 month or greater than 1-month post-injury. The prediction model output can be leveraged to determine optimum treatment plan for individual patients.

E. Applications of the Proposed Invention:

The prototype once matured as a device can be used by sport physicians in the sideline, battlefield medics for triage purposes, in mobile hospitals, ambulatory services and emergency trauma centers for screening and monitoring of TBI.

F. Advantages

Through this proposed TBI diagnostic-support solution it can be seen that the present disclosure provide solutions for the shortcomings in limited, standard 2D US technique: The advantages are as follows:

- 3D visualization of the ONS using ultrasound imaging,
- Real-time automated ONSD measurements,
- Real-time ONS elasticity measurements.
- Reduced dependency on the US technician, physician or medics for decision making,
- Use of multiple metrics to predict the onset of TBI reliably and accurately,
- Accounts for individual baseline variations and monitors TBI recovery,
- Technique applicable for screening the entire spectrum of TBI,
- Technique is applicable for detection of various ocular pathologies such as Glaucoma that require imaging of the optic nerve head and sheath.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A computer implemented method for detecting traumatic brain injury in a subject comprising the steps of:
    imaging the subject's optic nerve sheath (ONS), wherein imaging comprises obtaining a plurality of ONS images by means of an ultrasound imaging device operating in B-Mode and utilizing an H-transducer having a center transducer and left and right transducers, the device having a machine learning decision system and system application which is configured for;
    creating, by a computer implemented surface modeling algorithm and a tetrahedral decomposition volume modeling algorithm, a 3D model of at least a portion of the optic nerve sheath based on the B-Mode ultrasound imaging;
    analyzing the 3D model to compute, by a computer implemented geometric deformable model algorithm, geometric shape features of the optic nerve sheath (ONS), said geometric shape features comprising subject and template parameterized surface representations of a triangular mesh and displacement vectors defining a deformation between said subject and template parameterized surface representations;
    further imaging the subject's ONS at a predetermined depth by said ultrasound imaging device to obtain tissue elasticity values of a portion of the optic nerve sheath wall, wherein said transducer is first used in B-Mode to identify a particular area of interest, and then switched to shear pulse mode to obtain a plurality of shear pulse signals, and wherein said shear pulse signals received across multiple imaging frames are overlaid using cross-correlation to improve signal to noise ratio, and further wherein said shear pulse signals are color coded to visualize said tissue elasticity values across said regions of interest and overlaid onto a corresponding 2D image;
    providing the ONS geometric shape features and the tissue elasticity values to said machine learning decision system for analysis, said machine learning decision system utilizing a Decision Tree classification to provide a discriminatory decision outcome;
    analyzing, by said machine learning decision system the combined ONS geometric shape features and the tissue elasticity values;
    determining, by said machine learning decision system a discriminatory decision outcome of a traumatic brain injury based on the combined deformation between the subject and template parameterized surface representations of the ONS geometric shape features and the tissue elasticity values; and
    displaying, by a display device, a representation of the discriminatory decision outcome.

2. The method of claim 1, wherein the step of imaging in B-Mode comprises the steps of;
    obtaining a series of transverse ONS images;
    registering alignment of the transverse ONS images;
    reformatting the registered transverse ONS images to coronal slices;
    segmenting ONS contours from the coronal slices; and
    creating a 3D volumetric model from the segmented ONS contours.

3. The method of claim 2 wherein the step of imaging further comprises de-speckling of the coronal slices.

4. The method of claim 3 further comprising deriving shape features from the 3D volumetric model.

5. The method of claim 3 further comprising obtaining at least one additional data point from a non-invasive sensor.

6. The method of claim 5 wherein the at least one additional data point is selected from the group consisting of: Transcranial Doppler (TCD), Dynamic Cerebral Autoregulation (dCA), Pulse Oximetry (SpO2) and Blood Pressure (BP).

7. The method of claim 2 further comprising deriving shape features from the 3D volumetric model.

8. The method of claim 7 further comprising obtaining at least one additional data point from a non-invasive sensor.

9. The method of claim 8 wherein the at least one additional data point is selected from the group consisting of: Transcranial Doppler (TCD), Dynamic Cerebral Autoregulation (dCA), Pulse Oximetry (SpO2) and Blood Pressure (BP).

10. The method of claim 2 further comprising obtaining at least one additional data point from a non-invasive sensor.

11. The method of claim 10 wherein the at least one additional data point is selected from the group consisting of: Transcranial Doppler (TCD), Dynamic Cerebral Autoregulation (dCA), Pulse Oximetry (SpO2) and Blood Pressure (BP).

12. The method of claim 1 further comprising obtaining at least one additional data point from a non-invasive sensor.

13. The method of claim 12 wherein the at least one additional data point is selected from the group consisting of: Transcranial Doppler (TCD), Dynamic Cerebral Autoregulation (dCA), Pulse Oximetry (SpO2) and Blood Pressure (BP).

* * * * *